United States Patent [19]

Carolan et al.

[11] Patent Number: 5,269,822
[45] Date of Patent: Dec. 14, 1993

[54] PROCESS FOR RECOVERING OXYGEN FROM GASEOUS MIXTURES CONTAINING WATER OR CARBON DIOXIDE WHICH PROCESS EMPLOYS BARIUM-CONTAINING ION TRANSPORT MEMBRANES

[75] Inventors: Michael F. Carolan; Paul N. Dyer, both of Allentown; Stephen M. Fine, Emmaus; James M. LaBar, Sr., Tatamy, Robert M. Thorogood, Macungie; all of Pa.

[73] Assignee: Air Products and Chemicals, Inc., Allentown, Pa.

[21] Appl. No.: 937,768

[22] Filed: Sep. 1, 1992

[51] Int. Cl.$^5$ .................. B01D 53/22; B01D 71/02
[52] U.S. Cl. ................................... 95/54; 505/1; 505/701; 505/778; 505/785; 96/4
[58] Field of Search .............. 55/16, 68, 158, 523; 505/1, 700, 701, 778, 785, 809

[56] References Cited

U.S. PATENT DOCUMENTS

| | | | |
|---|---|---|---|
| 5,108,465 | 4/1992 | Bauer et al. | 55/16 |
| 5,162,301 | 11/1992 | Reich et al. | 55/158 X |
| 5,169,415 | 12/1992 | Roettger et al. | 55/16 X |

FOREIGN PATENT DOCUMENTS

| | | | |
|---|---|---|---|
| 0362898 | 4/1990 | European Pat. Off. | 55/16 |
| 55-119420 | 9/1980 | Japan | 55/16 |
| 56-092103 | 7/1981 | Japan | 55/16 |
| 57-207533 | 12/1982 | Japan | 55/158 |
| 58-064258 | 4/1983 | Japan | 55/158 |
| 59-055314 | 3/1984 | Japan | 55/158 |
| 59-055315 | 3/1984 | Japan | 55/158 |
| 59-150508 | 8/1984 | Japan | 55/158 |
| 59-177117 | 10/1984 | Japan | 55/16 |
| 60-044003 | 3/1985 | Japan | 55/158 |
| 60-051502 | 3/1985 | Japan | 55/158 |
| 61-002548 | 1/1986 | Japan | 55/158 |
| 61-238303 | 10/1986 | Japan | 55/158 |
| 63-156515 | 6/1988 | Japan | 55/158 |
| 63-156516 | 6/1988 | Japan | 55/158 |
| 1-219001 | 9/1989 | Japan | 55/16 |
| 1-310714 | 12/1989 | Japan | 55/158 |
| 0604826 | 9/1978 | Switzerland | 55/16 |

OTHER PUBLICATIONS

E. A. Cooper, et al. J. Mater. Res. 6 (1991) 1393.
Y. Gao, et al., J. Mater. Res. 5 (1990) 1363.

Primary Examiner—Robert Spitzer
Attorney, Agent, or Firm—Keith D. Gourley; James C. Simmons; William F. Marsh

[57] ABSTRACT

The invention is a process for recovering oxygen from an oxygen-containing gaseous mixture containing one or more components selected from water, carbon dioxide or a volatile hydrocarbon which process utilizes ion transport membranes comprising a multicomponent metallic oxide containing barium. The process utilizes a temperature regime which overcomes problems associated with degradation of barium-containing multicomponent oxides caused by carbon dioxide.

25 Claims, 4 Drawing Sheets

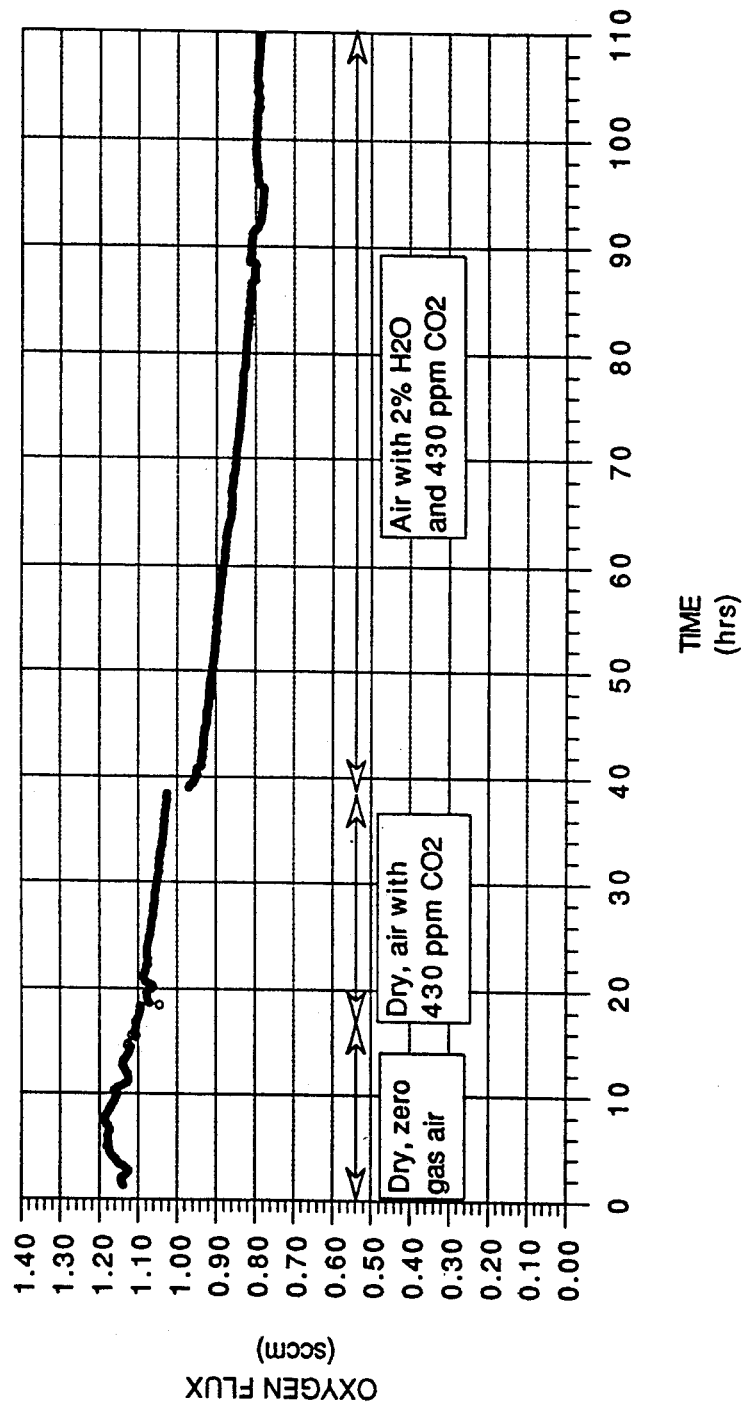

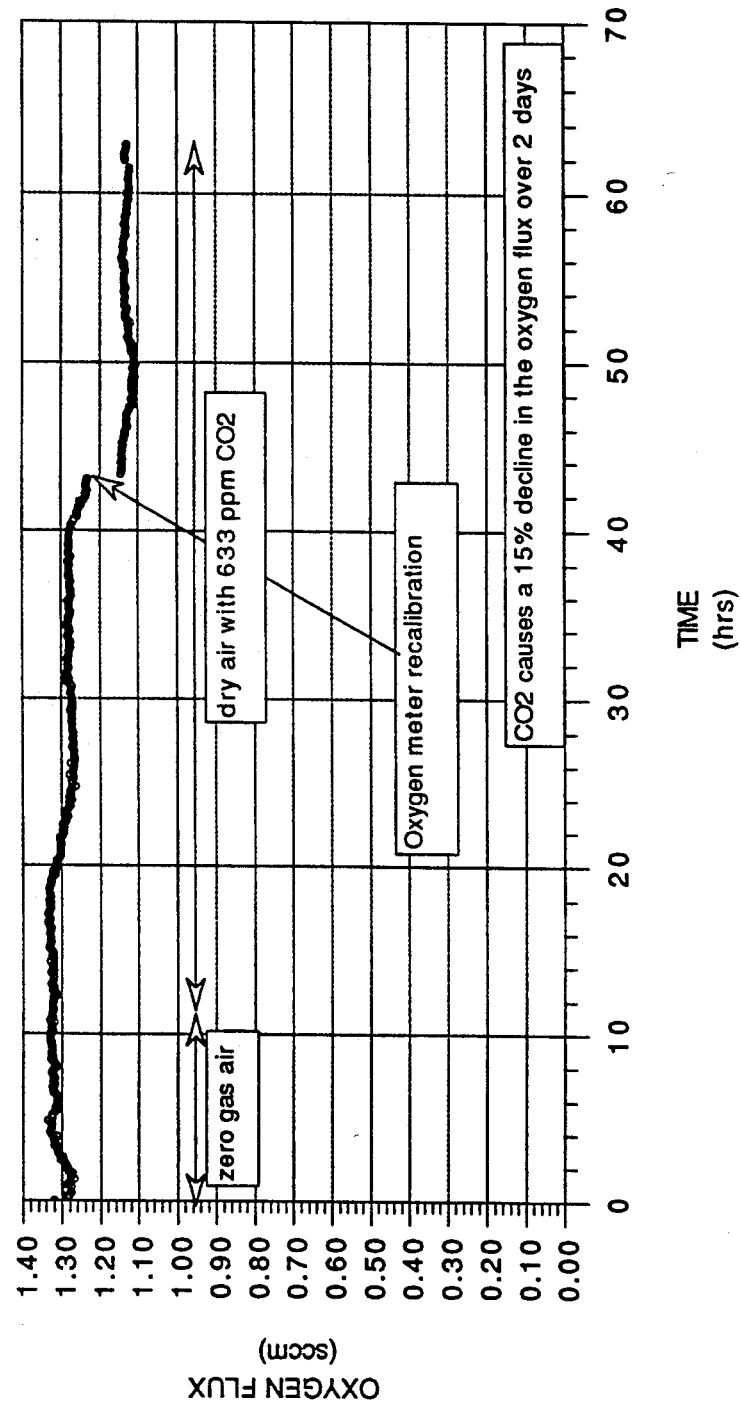

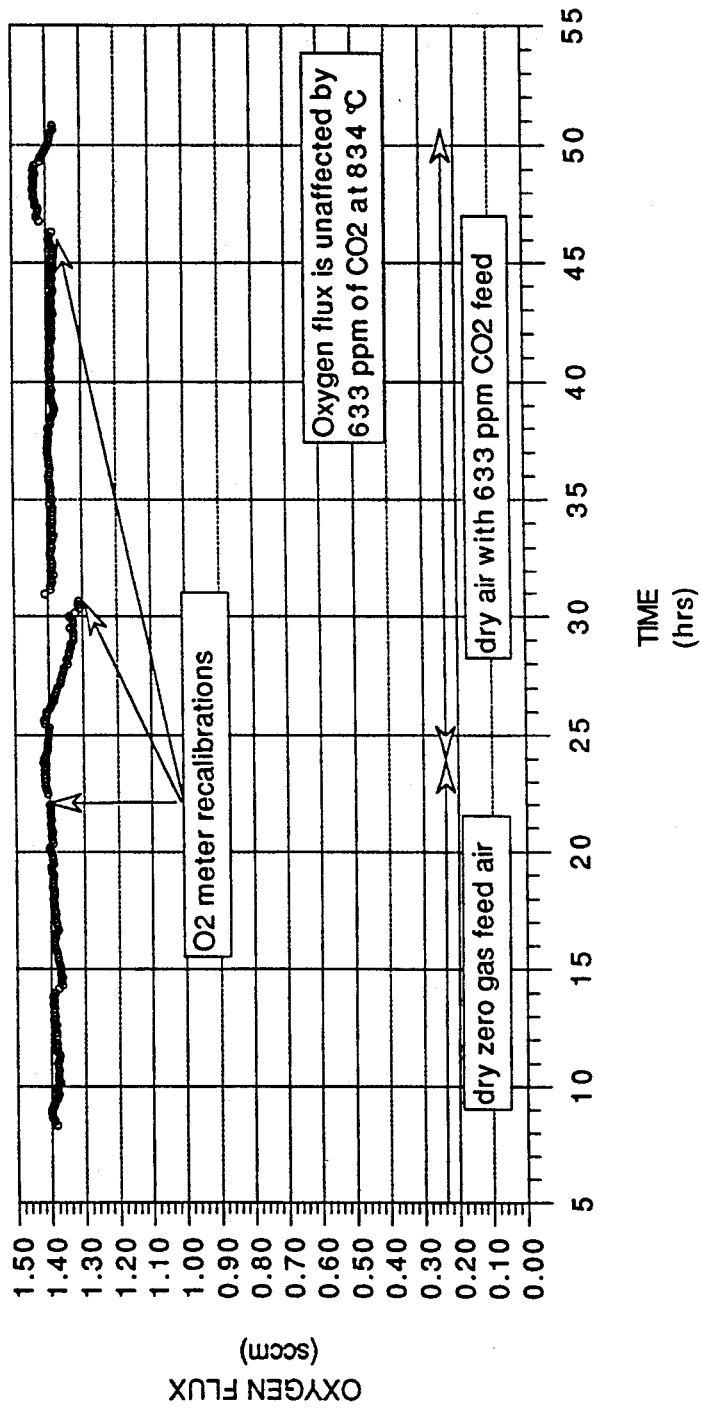

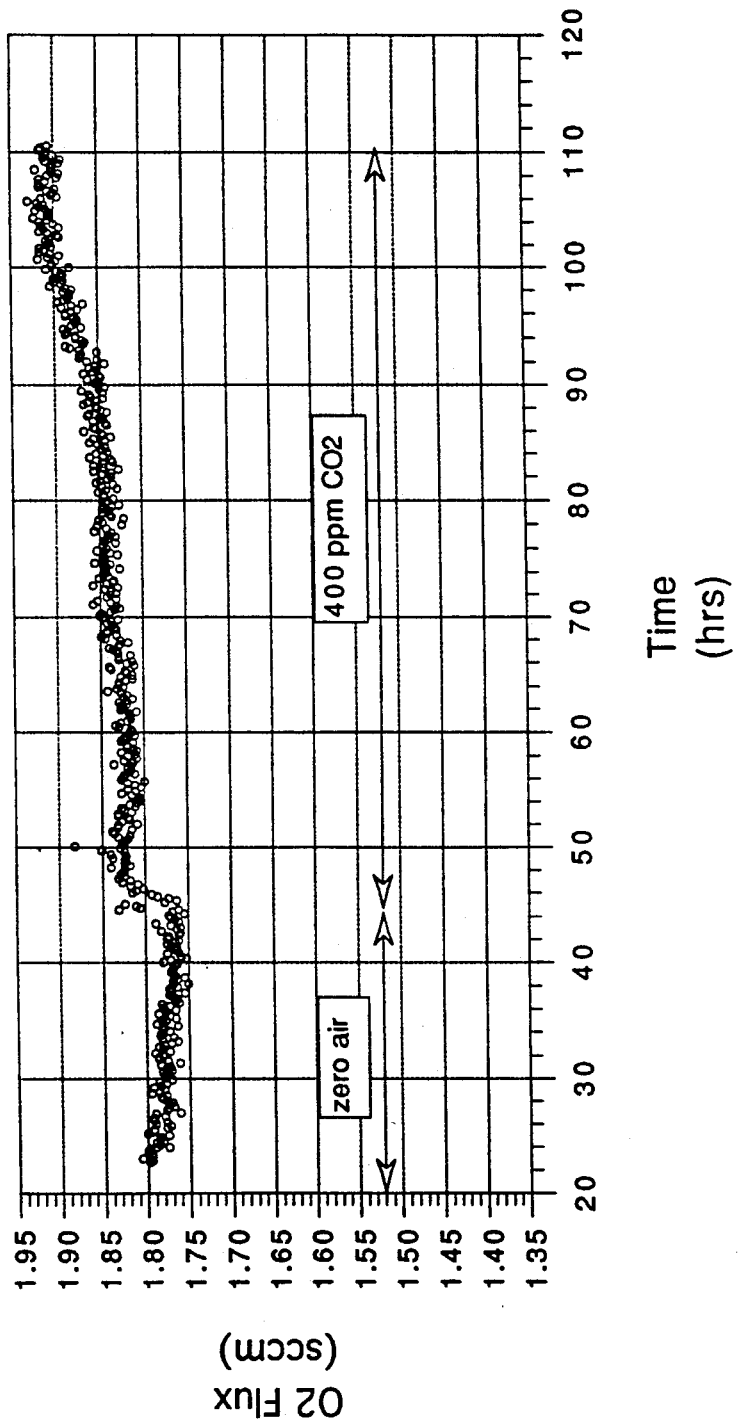

PROCESS FOR RECOVERING OXYGEN FROM GASEOUS MIXTURES CONTAINING WATER OR CARBON DIOXIDE WHICH PROCESS EMPLOYS BARIUM-CONTAINING ION TRANSPORT MEMBRANES

FIELD OF THE INVENTION

This invention relates to a process which utilizes membrane separation to recover substantially pure oxygen from oxygen-containing gaseous mixtures containing components such as water, carbon dioxide and volatile hydrocarbons. The process utilizes a class of ion transport membranes formed from multicomponent metallic oxides containing barium which are not deleteriously affected by such components. Therefore, the process eliminates the necessity to remove such components from the oxygen-containing gaseous mixture prior to conducting the membrane separation.

BACKGROUND OF THE INVENTION

Cryogenic distillation is currently the preferred process for producing high purity oxygen (>95%) in large scale plants (50–2000 ton/day). However, contaminants in the compressed air feed, i.e., water, carbon dioxide and trace hydrocarbons, must be removed before conducting the distillation process in order to prevent blocking of heat exchangers or distillation equipment and buildup of hazardous concentrations of hydrocarbons in the distillation column sump. Reversing heat exchangers are commonly employed to remove contaminants in the front end of the cryogenic plant wherein such contaminants are condensed in the exchanger passages and then removed with a waste gas stream. Alternately, adsorbent beds containing zeolites or alumina which require periodic regeneration are used to adsorb such contaminants. In addition, hydrocarbons must often be removed from the liquid oxygen sump by using an adsorbent such as silica gel. These methods lead to increased capital costs and inefficiencies in the overall separation processes.

Alternate methods for recovering oxygen from an oxygen-containing gaseous mixture include vacuum swing adsorption (VSA) and pressure swing adsorption (PSA) processes which employ selective adsorption of various components instead of conventional cryogenic steps to separate the mixture. As in the case of cryogenic processes, one or more of carbon dioxide, water and hydrocarbons must be separated from the feedstock prior to running the process to avoid deleterious interaction with the adsorbents.

Typical processes for removing carbon dioxide and water from an oxygen-containing gaseous mixture employ an adsorbent or desiccant and are capable of removing water vapor to very low levels, often to a dew point of less than −50° F. These processes possess a drawback in that the adsorbent bed must be regenerated, usually by purging the adsorbent bed with a low pressure dry waste gas or by using some portion of the product stream if a suitable waste gas stream is not available. Consequently, these systems are operated in a cyclic manner requiring duplication of equipment, operation of automated, timed switching valves and separate heater devices. An unavoidable loss of the gaseous feed often occurs during regeneration of the adsorbent.

U.S. Pat. No. 5,108,465 discloses a process for separating oxygen from an oxygen-containing gaseous mixture which comprises contacting the oxygen-containing gaseous mixture with a membrane which is impermeable to gas yet which is capable of conducting electrons and oxygen ions. The membranes are formed from a ceramic material selected from the group consisting of $BaFe_{0.5}Co_{0.5}YO_3$; yellow lead oxide; $ThO_2$; $Sm_2O_3$-doped $ThO_2$; $MoO_3$-doped $Bi_2O_3$; $Er_2O_3$-doped $Bi_2O_3$; $Gd_2Zr_2O_7$; $CaTi_{1-x}M_xO_{3-\alpha}$ wherein M is Fe, Co or Ni, x is 0–0.5 and $\alpha$ is 0–0.5; $SrCeO_3$; $YBa_2Cu_3O_{7-\beta}$ wherein $\beta$ is 0–1 and $(VO)_2P_2O_7$.

The ceramic materials disclosed in U.S. Pat. No. 5,108,465 comprise ionically conductive materials, which are commonly used in fabricating solid oxide fuel cell components, and superconducting materials. For example, $YBa_2Cu_3O_{7-\beta}$ is an ionically conductive superconducting material. However, barium-containing ceramic materials are well known to be adversely affected by the presence of carbon dioxide. For example, literature references teach that water and carbon dioxide will irreversibly degrade $YBa_2Cu_3O_7$ destroying superconductivity properties of the material upon contact with carbon dioxide at temperatures greater than about 400° C. This phenomena is discussed in numerous articles including those by E. A. Cooper et al., J. Mater. Res. 6 (1991) 1393 and Y. Gao et al., J. Mater. Res. 5 (1990) 1363. Therefore, one of ordinary skill in the art would expect that gas separation membranes formed from barium-containing ceramic materials would not be suitable for separating oxygen from oxygen-containing gaseous mixtures containing carbon dioxide, water or hydrocarbons.

Considerable effort is being expended in developing an oxygen recovery process wherein the feedstock does not have to be pretreated to remove carbon dioxide, water or volatile hydrocarbons prior to conducting the separation. Moreover, improved processes are being sought to develop barium-containing ceramic membranes which are capable of separating oxygen from oxygen-containing gaseous mixtures containing water or carbon dioxide.

SUMMARY OF THE INVENTION

The present invention relates to a process for recovering oxygen from an oxygen-containing gaseous mixture containing one or more components selected from water, carbon dioxide or a volatile hydrocarbon which process utilizes ion transport membranes comprising a multicomponent metallic oxide containing barium. The process provides numerous advantages over prior art process in that the oxygen-containing gaseous mixture to be separated into its respective components does not have to be pretreated to remove contaminants such as water, carbon dioxide or volatile hydrocarbons prior to effecting the separation.

The instant process which employs membranes formed from barium-containing multicomponent metallic oxides utilizes a temperature regime which overcomes prior art problems associated with degradation of barium-containing multicomponent oxides caused by carbon dioxide at elevated temperatures above about 400° C. Unexpectedly, Applicants have discovered that oxygen permeance of ion transport membranes formed from the enumerated class of barium-containing multicomponent metallic oxides is not degraded by presence of carbon dioxide, water or volatile hydrocarbons if the process is conducted at temperatures in excess of about 810° C.

The instant process for recovering oxygen from an oxygen-containing gaseous mixture containing one or more components selected from water, carbon dioxide or a volatile hydrocarbon comprises (a) delivering the oxygen-containing gaseous mixture into a first gas compartment which is separated from a second gas compartment by an ion transport membrane comprising a multicomponent metallic oxide containing barium; (b) establishing a positive oxygen partial pressure difference between the first and second gas compartments by producing an excess oxygen partial pressure in the first gas compartment and/or by producing a reduced oxygen partial pressure in the second gas compartment; (c) contacting the oxygen-containing gaseous mixture with the ion transport membrane at a temperature greater than about 810° C. to separate the compressed oxygen-containing gaseous mixture into an oxygen permeate stream and an oxygen-depleted gaseous stream; and (d) recovering the oxygen permeate stream.

The ion transport membranes suitable for practicing the claimed process comprise a multicomponent metallic oxide formed of at least two different metals or a mixture of at least two metal oxides wherein one of the metals is barium. Preferred multicomponent oxides of the present invention demonstrate both electron conductivity as well as oxygen ion conductivity at elevated temperatures.

Preferred multicomponent metallic oxide compositions are represented by $A_xBa_{x'}B_yB'_{y'}B''_{y''}O_{3-z}$, where A is chosen from the group comprising Groups 1, 2 and 3 and the F block lanthanides; and B, B' and B'' are chosen from the D block transition metals according to the Periodic Table of the Elements adopted by the IUPAC wherein $0 < x' \leq 1$, $0 \leq x \leq 1$, $0 < y \leq 1$, $0 \leq y' \leq 1$, $0 \leq y'' \leq 1$, $x + x' = 1$, $y + y' + y'' = 1$ and z is a number which renders the composition charge neutral.

BRIEF DESCRIPTION OF THE DRAWINGS

FIG. 1 is a plot of oxygen flux versus time observed during separation of oxygen from an oxygen-containing mixture using an ion transport membrane comprising $La_{0.2}Ba_{0.8}Co_{0.8}Fe_{0.2}O_{2.6}$ at 783° C.

FIG. 2 is a plot of oxygen flux versus time observed during separation of oxygen from an oxygen-containing mixture using an ion transport membrane comprising $La_{0.2}Ba_{0.8}Co_{0.8}Fe_{0.2}O_{2.6}$ at 808° C.

FIG. 3 is a plot of oxygen flux versus time observed during separation of oxygen from an oxygen-containing mixture using an ion transport membrane comprising $La_{0.2}Ba_{0.8}Co_{0.8}Fe_{0.2}O_{2.6}$ at 834° C.

FIG. 4 is a plot of oxygen flux versus time observed during separation of oxygen from an oxygen-containing mixture using an ion transport membrane comprising $Pr_{0.2}Ba_{0.8}Co_{0.8}Fe_{0.2}O_{2.6}$ at 831° C.

DETAILED DESCRIPTION OF THE INVENTION

The present invention relates to a process for recovering oxygen from an oxygen-containing gaseous mixture containing one or more components selected from water, carbon dioxide or a volatile hydrocarbon which process utilizes ion transport membranes comprising a multicomponent metallic oxide containing barium. Applicants' process for recovering oxygen from an oxygen-containing gaseous mixture does not require removing contaminants such as water, carbon dioxide or volatile hydrocarbons prior to effecting the separation processes.

The instant process for recovering oxygen from an oxygen-containing gaseous mixture containing one or more components selected from water, carbon dioxide or a volatile hydrocarbon comprises: (a) delivering the oxygen-containing gaseous mixture into a first gas compartment which is separated from a second gas compartment by an ion transport membrane comprising a multicomponent metallic oxide containing barium; (b) establishing a positive oxygen partial pressure difference between the first and second gas compartments by producing an excess oxygen partial pressure in the first gas compartment and/or by producing a reduced oxygen partial pressure in the second gas compartment; (c) contacting the oxygen-containing gaseous mixture with the ion transport membrane at a temperature greater than about 810° C. to separate the compressed oxygen-containing gaseous mixture into an oxygen permeate stream and an oxygen-depleted gaseous stream; and (d) recovering the oxygen permeate stream.

Applicants' process which employs membranes formed from barium-containing multicomponent metallic oxides utilizes a temperature regime which overcomes prior art problems associated with degradation of barium-containing multicomponent oxides caused by carbon dioxide and water at elevated temperatures. Unexpectedly, Applicants have discovered that oxygen permeance of ion transport membranes formed from the enumerated class of barium-containing multicomponent metallic oxides is not degraded by presence of carbon dioxide, water or volatile hydrocarbons in the oxygen-containing gaseous mixture to be separated if the process is conducted at temperatures in excess of about 810° C.

Applicants' discovery that membranes comprising the enumerated multicomponent metallic oxides containing barium are not degraded by carbon dioxide when operated under the claimed temperature regime represents a significant breakthrough. For example, barium-containing ceramic materials are well known to be adversely affected by the presence of carbon dioxide and/or water. For example, literature references teach that carbon dioxide will irreversibly degrade $YBa_2Cu_3O_{7-\beta}$ destroying superconductivity properties of the material upon contact with carbon dioxide at temperatures greater than about 400° C. This phenomena is discussed in numerous articles including those by E. A. Cooper et al., J. Mater. Res. 6 (1991) 1393 and Y. Gao et al., J. Mater. Res. 5 (1990) 1363.

The first step of Applicants' process comprises delivering an oxygen-containing gaseous mixture into contact with an ion transport membrane formed from a multicomponent metallic oxide containing barium wherein the membrane separates a first gas compartment and a second gas compartment. Any conventional apparatus can be utilized to house the ion transport membranes of the present invention whereby the membrane forms a partition between the first and second gas compartments. A representative apparatus is disclosed in U.S. Pat. No. 5,035,727, issued to Air Products and Chemicals, Allentown, Pa.

The ion transport membrane provides a gas-tight partition between the first and second gas compartments wherein the membrane is impervious to the components of the oxygen-containing gaseous mixture at ambient temperature. The ion transport membranes of the present invention comprise a multicomponent metallic oxide formed of at least two different metals or a mixture of at least two metal oxides wherein one of the metals is barium. Preferred multicomponent metallic oxides demonstrate both electron conductivity as well as oxide ion conductivity at elevated temperatures and are referred to as mixed conductors.

Preferred multicomponent metallic oxides are represented by the structure $A_xBa_{x'}B_yB'_{y'}B''_{y''}O_{3-z}$, where A is chosen from the group comprising Groups 1, 2 and 3 and the F block lanthanides; and B, B' and B'' are chosen from the D block transition metals according to the Periodic Table of the Elements adopted by the IUPAC wherein $0 < x' \leq 1$, $0 \leq x \leq 1$, $0 < y \leq 1$, $0 \leq y' \leq 1$, $0 \leq y'' \leq 1$, $x + x' = 1$, $y + y' + y'' = 1$ and z is a number which renders the compound charge neutral. Representative multicomponent metallic oxides include -$La_{0.2}Ba_{0.8}Co_{0.8}Fe_{0.2}O_{3-z}$; $Pr_{0.2}Ba_{0.8}Co_{0.8}Fe_{0.2}O_{3-z}$; and -$La_{0.2}Ba_{0.8}Co_{0.6}Cu_{0.2}Fe_{0.2}O_{3-z}$.

A self-supporting ion transport membrane of this invention can be prepared by compressing a sintered and ground powder of the desired multicomponent metallic oxide containing barium into the desired shape according to procedures known in the art. Care should be taken to ensure that the membrane is free from cracks and through-porosity which would greatly diminish or destroy the selectivity achieved by the process. The membranes can also be fabricated by slip or tape casting and injection molding processes according to procedures known in the art.

In a preferred embodiment, a thin layer of the multicomponent metallic oxide containing barium is deposited onto a porous support. Use of a porous substrate for receiving the multicomponent metallic oxide greatly improves the mechanical stability of the resulting ion transport membrane. A wide variety of porous substrates are capable of receiving the enumerated multicomponent metallic oxides. Such porous substrates possess a network of pores such that a gas can penetrate through the substrate (i.e., through-porosity). Therefore, the term, porous substrate, does not refer to materials which merely possess surface or closed internal porosity.

Suitable porous substrates include metal oxide-stabilized zirconia such as yttria-stabilized zirconia and calcium-stabilized zirconia, alumina, magnesia, silica, titania, a high temperature oxygen compatible metal alloy, and compounds and mixtures thereof. Any combination of porous substrate and multicomponent metallic oxide containing barium can be utilized so long as their coefficients of thermal expansion are compatible and chemical reactions are minimized between the substrate and multicomponent metallic oxide at operating temperatures of the ion transport membrane. Thin layers of the desired multicomponent metallic oxide having a thickness ranging from 10 microns to about 0.1 microns in thickness can be deposited onto the enumerated porous substrate by known techniques such as chemical vapor deposition and the like. A preferred technique for manufacturing ultrathin inorganic membranes is presented in U.S. patent application Ser. No. 07/816,206, filed on Jan. 1, 1992, now U.S. Pat. No. 5,160,618, which is assigned to Air Products and Chemicals, Inc., Allentown, Pa.

Oxygen-containing gaseous mixtures containing one or more components selected from carbon dioxide, water and a volatile hydrocarbon which are capable of being separated according to the present process typically contain between about 10 vol. % to 50 vol. % oxygen. The preferred oxygen-containing gaseous mixture is atmospheric air. Representative hydrocarbons which will not adversely affect operation of this process include linear and branched alkanes, alkenes and alkynes having from 1 to about 6 carbon atoms and aromatics having from 6 to about 8 carbon atoms. Such hydrocarbons are believed to be converted to carbon dioxide and water under the process operating conditions thereby causing no adverse effect on the separation process.

If the multicomponent metallic oxide demonstrates both oxygen ionic and electronic conductivities, the oxide is said to be mixed conducting. Particularly useful for practical purposes are those in which the ionic and electronic conductivities are comparable or balanced. When fabricated in the form of a thin membrane, such oxides can be used to separate oxygen from an oxygen-containing gaseous mixture such as air by maintaining an oxygen partial pressure difference between the feed and permeate sides of the ion transport membrane, i.e., the first and second gas compartments. Examples of such materials are described in U.S. Pat. No. 4,330,633 and Japanese Patent Application 61-21717.

In the latter, the mixed conducting perovskite structure oxide $La_{1-x}Sr_xCo_{1-y}Fe_yO_{3-d}$ is mentioned, where x ranges from 0.1 to 1.0 and y from 0.05 to 1.0. Oxides of this type have an oxygen ionic conductivity of approximately $10^{-2}$ ohm$^{-1}$cm$^{-1}$ and an electronic conductivity of approximately $10^2$ ohm$^{-1}$cm$^{-1}$ at a temperature of about 800° C. When an oxygen-containing gaseous mixture at a higher partial pressure is applied to one side (the first gas compartment) of a 1-5 mm thick disc of multicomponent metallic oxide, oxygen will adsorb and dissociate on the surface, become ionized and diffuse through the solid and deionize, associate and desorb as a separated oxygen gas stream at the lower oxygen partial pressure surface (the second gas compartment).

The necessary circuit of electrons to supply this ionization/deionization process is maintained internally in the oxide via its electronic conductivity. This type of separation process is particularly suitable for separating oxygen from a gas stream containing a relatively high partial pressure of oxygen, i.e., greater than or equal to 0.2 atm. Multicomponent metallic oxides containing barium which demonstrate both oxygen ionic conductivity and electronic conductivity typically demonstrate an oxygen ionic conductivity ranging from 0.01 ohm$^{-1}$cm$^{-1}$ to 100 ohm$^{-1}$cm$^{-1}$ and an electronic conductivity ranging from about 1 ohm$^{-1}$cm$^{-1}$ to 100 ohm$^{-1}$cm$^{-1}$.

Some multicomponent metallic oxides are primarily or solely oxygen ionic conductors at elevated temperatures. An example is $(Y_2O_3)_{0.1}(Zr_2O_3)_{0.9}$ which has an oxygen ionic conductivity of 10 ohm$^{-1}$cm$^{-1}$ at 1000° C. and an ionic transport number (the ratio of the ionic conductivity to the total conductivity) close to 1. A multicomponent oxide of this type can be used to separate oxygen in one of two ways. European Patent Application EP 0399833A1 describes a membrane formed from a composite of this oxide with a separate electronically conducting phase, such as platinum or another noble metal. The electronic conducting phase will provide the return supply of electrons through the structure allowing oxygen to be ionically conducted through the composite membrane under a partial pressure gradient driving force as described previously.

Alternatively, porous electrodes can be applied to the surface of the mixed oxide ionic conductor and short circuited externally to complete the electronic circuit for an oxygen partial pressure driven process. Another method, which is particularly useful to separate oxygen from mixtures containing relatively low partial pressures of oxygen, is to apply an external electric potential between the porous electrodes connected to the surface of the oxygen ionically conducting mixed oxide. The externally applied potential supplies and removes electrons from the surface and drives the oxygen ionic current, producing a separated oxygen stream at a higher partial pressure via the Nernst effect. This method is well known and is described in U.S. Pat. No. Re. 28,792. Typical oxygen ion conductivities for barium-containing multicomponent oxides of this type range from 0.01 ohm$^{-1}$cm$^{-1}$ to 100 ohm$^{-1}$cm$^{-1}$.

Another category of multicomponent metallic oxides exhibit primarily or solely electronic conductivity at elevated temperatures and their ionic transport numbers are close to zero. An example is $Pr_xIn_yO_z$ which is described in European Patent Application EP 0,399,833 A1. Such materials may be used in a composite membrane with a separate oxygen ionic conducting phase such as a stabilized $Zr_2O_3$. A membrane constructed from a composite of this type may also be used to separate oxygen from an oxygen-containing stream such as air by applying an oxygen partial pressure gradient as the driving force. Typically, the multicomponent oxide electronic conductor is placed in intimate contact with an oxygen ionic conductor.

The next steps of the process comprise establishing a positive oxygen partial pressure difference between the first and second gas compartments by producing an excess oxygen partial pressure in the first compartment and/or by producing a reduced oxygen partial pressure in the second gas compartment and contacting the oxygen-containing gaseous mixture with the ion transport membrane at a temperature greater than about 810° C. to separate the compressed oxygen-containing gaseous mixture into an oxygen permeate stream and an oxygen-depleted gaseous stream.

A difference in oxygen partial pressure between the first and second compartments provides the driving force for effecting the separation when the process temperature is elevated to a sufficient temperature to cause oxygen in the oxygen-containing gaseous mixture residing in the first compartment to adsorb, become ionized via the membrane and to be transported through the membrane in the ionic form. A pure oxygen product is collected in the second gas compartment wherein ionic oxygen is converted into the neutral form by the release of electrons in the second gas compartment which resides at lower oxygen partial pressures than the first gas compartment.

A positive oxygen partial pressure difference between the first and second gas compartments can be created by compressing air in the first compartment to a pressure sufficient to recover the oxygen permeate stream at a pressure of greater than or equal to about one atmosphere. Typical pressures range from about 15 psia to about 250 psia and the optimum pressure will vary depending upon the amount of oxygen in the oxygen-containing gaseous mixture. Conventional compressors can be utilized to achieve the compression required to practice the present step of the process. Alternately, a positive oxygen partial pressure difference between the first and second gas compartments can be achieved by evacuating the second gas compartment to a pressure sufficient to recover the oxygen permeate.

A migration of oxygen ions from the oxygen-rich side to the oxygen-deficient side of the membrane and a migration of electrons in the opposite direction takes place in the ion transport membrane. Thus, the membranes according to the present invention shall be referred to as ion transport membranes. Accordingly, only oxygen selectively permeates electrochemically through the ion transport membrane and oxygen gas having a high purity can be obtained in the second gas compartment which resides at a lower oxygen partial pressure than the first gas compartment.

The final step of the process comprises recovering the oxygen-containing gaseous mixture by storing the substantially pure oxygen in a suitable container or transferring the same to another process. The oxygen permeate typically comprises pure oxygen or high purity oxygen defined as a gas generally containing at least about 90 vol. % $O_2$, preferably more than about 95 vol % $O_2$ and especially more than 99 vol. % $O_2$.

The following examples are provided to further illustrate Applicants' claimed process. Such examples are illustrative and are not intended to limit the scope of the appended claims.

EXAMPLE 1

Preparation of Multicomponent Metallic Oxide Powders Containing Barium

The barium-containing multicomponent metallic oxides of the present invention can be conveniently prepared by calcining a mixture of the particular metal salts in air to produce the desired barium-containing multicomponent metallic oxide. The metal salts are hygroscopic and must be weighed in a nitrogen purged glove box. The metal salts used were iron nitrate, cobalt nitrate, cobalt acetate, copper acetate, lanthanum acetate, lanthanum nitrate, strontium acetate, strontium nitrate, barium acetate and barium nitrate.

The stoichiometry of desired final metal oxide compound was determined in order to assess the amounts of metals salts to be used. Each metal salt was individually weighed in a nitrogen purged glove box. Distilled water was then heated in a glass dish on a hot plate and the respective metal salts were added thereto. If the particular multicomponent oxide contained iron nitrate, then the iron nitrate was added last to the water solution with each metal salt being fully dissolved before adding the next salt. Additional water was added as needed.

The resulting aqueous mixture of metal salts was stirred with a magnetic stir bar to mix the solution. After the salts were dissolved, hot plate temperature was increased until the solution boiled. Boiling was continued under agitation until the solution was nearly dry causing the metal salts to precipitate. The nearly dry solution was removed from hot plate and placed in a 120° C. oven to finish drying. The dried mixed salts were removed from the drying dish and ground with a mortar and pestle until a fine powder was obtained.

The resulting powder was placed in a zirconia crucible or boat and calcined by ramping at 1° C./min. to 250° C., and holding the temperature for 5 hours. The temperature was then ramped at 5° C./min to 850° C. and held for 10 hours followed by cooling to ambient temperature at 5° C./min. Finally, the powders were ground in a mortar and pestle and sieved on a 400 mesh screen.

EXAMPLE 2

Preparation of Sintered Pellet of Multicomponent Metallic Oxide Powders Containing Barium The membranes presented in the specification were prepared in the form of disks, approximately ¾ inches in diameter and less than 2 mm thick. Pellets of the multicomponent metallic oxide powders prepared according to Example 1 were pressed with force of 20,000 lbs for 3 to 10 minutes. Dies used were either tool steel or graphite and had a diameter of 0.95 inches. Binders were occasionally used to hold the green pellet together. Either 600 or 3400 molecular weight polyethylene glycol, in a concentration of 3-5 weight percent was mixed with the powder by dissolving the binder in methanol and adding the powder to the binder solution. The resulting slurry was dried in air with occasional stirring.

The pressed pellets were placed on setters made of zirconia insulation, chosen for its low thermal mass and high porosity. Sintered pellets of the same composition as the green pellets were placed between the zirconia and the green pellets to prevent possible interaction between the setter and pellets to be sintered. The sintering schedule varied with the composition used and whether or not a binder was used. In the absence of a binder, the pellets were ramped at 20° C./min. to the sintering temperature, held for 5 hours and cooled at 1° C. to room temperature.

The preferred binder burnout and sintering schedule for $La_{0.2}Ba_{0.8}Co_{0.8}Fe_{0.2}O_{2.6}$ is summarized as follows:

1. Ramp temperature at 1° C./min. to 125° C. Hold at 125° C. for 1 hour;
2. Ramp temperature at 1° C./min from 125° C. to 150° C. Hold at 150° C. for 1 hour;
3. Ramp temperature at 1° C./min from 150° C. to 175° C. Hold at 175° C. for 1 hour;
4. Ramp temperature at 1° C./min from 175° C. to 200° C. Hold at 200° C. for 1 hour;
5. Ramp temperature at 1° C./min from 200° C. to 250° C. Hold at 250° C. for 1 hour;
6. Ramp temperature at 20° C./min from 250° C. to 1100° C. Hold at 1100° C. for 5 hours; and
7. Cool to room temperature at rate of 1° C./min.

Both calcined powder and sintered pellets were characterized by x-ray diffraction. In addition, some samples were analyzed by ICP to obtain elemental analysis and depth profiled by dynamic SIMS or sputtered XPS depth profiling.

EXAMPLE 3

Separation of Oxygen from Oxygen-Containing Gaseous Mixtures Using Sintered Pellet of Multicomponent Metallic Oxide Powders Containing Barium The pellets prepared according to Example 2 were tested utilizing a conventional testing apparatus typical of those known in the art. The membrane to be tested was sealed onto the end of an alumina tube using a Pyrex brand glass O-ring. One side of the pellet was exposed to a mixture of zero grade air (21% oxygen, 79% nitrogen and <0.5 ppm each of carbon dioxide, water and methane), supplied by Air Products and Chemicals, Inc., Allentown, Pa., mixed with controlled amounts of carbon dioxide and water, while the other side of the pellet was exposed to UHP helium or UHP argon. Air or nitrogen flow rates could be varied between 0 and 1000 sccm and argon and helium flow rates could be varied up to 5000 sccm. The oxygen content of the oxygen permeate stream exiting the apparatus was measured with a Teledyne oxygen analyzer and a portion of the oxygen permeate stream was sent to a Spectramass Dataquad mass spectrometer in order to detect and measure the presence of leaks in the membrane.

The oxygen-containing gaseous mixture to be separated containing carbon dioxide and water consisted of APCI zero grade air at a flow rate of 930 sccm mixed with either 10,500 ppm $CO_2$ in $N_2$, or 1.5% carbon dioxide in zero grade air. Humidification of the gas was accomplished by bubbling the air through water at room temperature. The measured dew point of the air was 20°-21° C.

FIGS. 1 through 3 demonstrate a plot of oxygen flux versus time observed during separation of oxygen from an oxygen-containing mixture using an ion transport membrane comprising $La_{0.2}Ba_{0.8}Co_{0.8}Fe_{0.2}O_{2.6}$ at 783° C., 808° C. and 834° C. The feed to the pellet was initially zero grade air (referred to in the Figures as zero gas) in each Figure. The feed was then switched to air with 430 ppm carbon dioxide and then to air with carbon dioxide and water.

FIG. 1 illustrates the effects at 783° C. of $CO_2$ and $H_2O$ in the air feed on the oxygen permeation rate through a disc of $La_{0.2}Ba_{0.8}Co_{0.8}Fe_{0.2}O_{2.6}$. With a dry, $CO_2$ free air feed (zero grade air), the oxygen flux remained constant within experimental error over a period of 20 hours at $\sim 1.1$ sccm/cm$^2$. After adding 430 ppm of $CO_2$ to the dry air feed, the oxygen flux steadily decreased over a further period of 20 hours to $\sim 1.0$ sccm/cm$^2$. With the addition of 2% water and 430 ppm $CO_2$ to the air feed, the oxygen flux decreased over a further 3 day period of continuous use to 0.8 sccm/cm$^2$. The oxygen flux remained at this value when the $CO_2$ and water were removed from the air feed. This shows that the oxygen flux through this material is adversely affected by the presence of $CO_2$ and $H_2O$ at 783° C.

FIG. 2 illustrates a similar experiment carried out at 808° C. With dry $CO_2$ free air, the oxygen flux was constant at this temperature at 1.32 sccm/cm$^2$ over a twelve hour period. With the addition of 633 ppm of $CO_2$ to the air feed, the oxygen flux through the membrane decreased over a further 2 days of continuous use by 15% to 1.12 sccm/cm$^2$. This shows that the oxygen flux through this material is adversely affected by the presence of $CO_2$ at 808° C., and that the effects of $CO_2$ are observed only over periods of several days continuous use.

FIG. 3 illustrates that the oxygen flux is unaffected by exposure to $CO_2$ at a higher temperature of 834° C. Dry zero grade air was used initially as the air feed for 24 hours, during which the oxygen flux remained constant at 1.40 sccm/cm$^2$. When 633 ppm of $CO_2$ was added to the air feed, the oxygen flux remained constant over a further 24 hours of continuous exposure. An additional experiment confirmed that at 837° C., the oxygen flux through the membrane was unaffected by continuous exposure for 80 hours to an air feed containing 2% $H_2O$ and 439 ppm of $CO_2$. Therefore, the deleterious effects of $CO_2$ and $H_2O$ on the oxygen flux, observed at temperature below 810° C., are avoided by operating above this temperature.

FIG. 4 illustrates the effect observed at 831° C. of $CO_2$ in the air feed on the oxygen permeation rate through a disc of composition $Pr_{0.2}Ba_{0.8}Co_{0.8}Fe_{0.2}O_{3-z}$. With a $CO_2$ free air feed (zero grade) for the initial 45 hours, the observed oxygen flux was constant at 1.77 sccm/cm². When 400 ppm of $CO_2$ was added to the air feed, the oxygen flux was observed to rapidly increase to 1.82 sccm/cm², and this was followed by an additional slow increase over a 60 hour period to 1.90 sccm/cm². This example demonstrates that the oxygen flux through a membrane of this composition can be increased by the presence of $CO_2$ in the air feed at this temperature.

Having thus described the present invention, what is now deemed appropriate for Letter Patent is set forth in the Following claims.

We claim:

1. A process for recovering oxygen from an oxygen-containing gaseous mixture containing one or more components selected from water, carbon dioxide or a volatile hydrocarbon, the process which comprises the steps of:
   (a) delivering the oxygen-containing gaseous mixture into a first gas compartment which is separated from a second gas compartment by an ion transport membrane comprising a multicomponent metallic oxide containing barium, but excluding yttrium;
   (b) establishing a positive oxygen partial pressure difference between the first and second gas compartments by producing an excess oxygen partial pressure in the first gas compartment and/or by producing a reduced oxygen partial pressure in the second gas compartment;
   (c) contacting the oxygen-containing gaseous mixture with the ion transport membrane at a temperature greater than about 810° C. to separate the oxygen-containing gaseous mixture into an oxygen permeate stream and an oxygen-depleted gaseous stream; and
   (d) recovering the oxygen permeate stream.

2. The process according to claim 1 wherein the oxygen-containing gaseous mixture is air.

3. The process according to claim 2 wherein the positive oxygen partial pressure difference is obtained by compressing air in the first gas compartment to a pressure sufficient to recover the oxygen permeate stream at a pressure of greater than or equal to about one atmosphere.

4. The process according to claim 3 wherein the pressure in the first gas compartment required to recover the oxygen permeate stream ranges from 15 to 250 psia.

5. The process according to claim 2 wherein the positive oxygen partial pressure difference is obtained by evacuating the second gas compartment to a pressure sufficient to recover the oxygen permeate stream.

6. The process according to claim 1 where the multicomponent metallic oxide demonstrates oxygen ionic conductivity and electronic conductivity.

7. The process according to claim 6 wherein the multicomponent metallic oxide demonstrates an oxygen ionic conductivity ranging from 0.01 $ohm^{-1}cm^{-1}$ to 100 $ohm^{-1}cm^{-1}$ and an electronic conductivity ranging from about 1 $ohm^{-1}cm^{-1}$ to 100 $ohm^{-1}cm^{-1}$.

8. The process according to claim 1 wherein the ion transport membrane comprises a multicomponent oxide electronic conductor which is placed in intimate contact with an oxygen ionic conductor.

9. The process according to claim 1 wherein the ion transport membrane comprises a multicomponent metallic oxide oxygen ionic conductor which is placed in intimate contact with an electronic conductor.

10. The process according to claim 1 where the ion transport membrane comprises a multicomponent metallic oxide demonstrating oxygen ionic conductivity wherein external electrodes are attached to the multicomponent metallic oxide and an electrical potential is applied across the electrodes.

11. The process according to claim 10 wherein the ion transport membrane possesses an ionic conductivity ranging from 0.01 $ohm^{-1}cm^{-1}$ to 100 $ohm^{-1}cm^{-1}$.

12. A process for recovering oxygen from an oxygen-containing gaseous mixture containing one or more components selected from water, carbon dioxide or a volatile hydrocarbon, the process which comprises the steps of:
   (a) delivering the oxygen-containing gaseous mixture into a first gas compartment which is separated from a second gas compartment by an ion transport membrane comprising a composition represented by the structure $A_xBa_{x'}B_yB'_{y'}B''_{y''}O_{3-z}$, where A is chosen from the group comprising Groups 1, 2 and 3 and the F block lanthanides with the proviso that A is not yttrium; and B, B' and B" are chosen from the D block transition metals according to the Periodic Table of the Elements adopted by the IUPAC wherein $0 < x' \leq 1$, $0 \leq x \leq 1$, $0 < y \leq 1$, $0 \leq y' \leq 1$, $0 \leq y'' \leq 1$, $x + x' = 1$, $y + y' + y'' = 1$ and z is a number which renders the compound charge neutral,;
   (b) establishing a positive oxygen partial pressure difference between the first and second gas compartments by producing an excess oxygen partial pressure in the first gas compartment and/or by producing a reduced oxygen partial pressure in the second gas compartment;
   (c) contacting the oxygen-containing gaseous mixture with the ion transport membrane at a temperature greater than about 810° C. to separate the oxygen-containing gaseous mixture into an oxygen permeate stream and an oxygen-depleted gaseous stream; and
   (d) recovering the oxygen permeate stream.

13. The process according to claim 12 wherein the oxygen-containing gaseous mixture is air.

14. The process according to claim 13 wherein the positive oxygen partial pressure difference is obtained by compressing air in the first gas compartment to a pressure sufficient to recover the oxygen permeate stream at a pressure of greater than or equal to about one atmosphere.

15. The process according to claim 14 wherein the pressure in the first gas compartment required to recover the oxygen permeate stream ranges from 15 to 250 psia.

16. The process according to claim 13 wherein the positive oxygen partial pressure difference is obtained by evacuating the second gas compartment to a pressure sufficient to recover the oxygen permeate stream.

17. The process according to claim 12 where the multicomponent metallic oxide demonstrates oxygen ionic conductivity and electronic conductivity.

18. The process according to claim 17 wherein the multicomponent metallic oxide demonstrates an oxygen ionic conductivity ranging from 0.01 $ohm^{-1}cm^{-1}$ to 100 $ohm^{-1}cm^{-1}$ and an electronic conductivity ranging from about 1 $ohm^{-1}cm^{-1}$ to 100 $ohm^{-1}cm^{-1}$.

19. The process according to claim 12 wherein the ion transport membrane comprises a multicomponent oxide electronic conductor which is placed in intimate contact with an oxygen ionic conductor.

20. The process according to claim 12 wherein the ion transport membrane comprises a multicomponent oxide oxygen ionic conductor which is placed in intimate contact with an electronic conductor.

21. The process according to claim 12 wherein the ion transport membrane comprises a multicomponent oxide demonstrating oxygen ionic conductivity wherein external electrodes are attached to the multicomponent oxide capable of applying an electrical potential across the membrane.

22. The process according to claim 21 wherein the ion transport membrane possesses an oxygen ionic conductivity ranging from 0.01 ohm$^{-1}$cm$^{-1}$ to 100 ohm$^{-1}$cm$^{-1}$.

23. The process according to claim 12 wherein the multicomponent metallic oxide is represented by the composition $La_{0.2}Ba_{0.8}Co_{0.8}Fe_{0.2}O_{3-z}$ wherein z is a number which renders the compound charge neutral.

24. The process according to claim 12 wherein the multicomponent metallic oxide is represented by the composition $Pr_{0.2}Ba_{0.8}Co_{0.8}Fe_{0.2}O_{3-z}$ wherein z is a number which renders the compound charge neutral.

25. The process according to claim 12 wherein the multicomponent metallic oxide is represented by the composition $La_{0.2}Ba_{0.8}Co_{0.6}Cu_{0.2}Fe_{0.2}O_{3-z}$ wherein z is a number which renders the compound charge neutral.

* * * * *